United States Patent [19]
King

[11] 3,932,928
[45] Jan. 20, 1976

[54] METHOD OF INSULATING STATOR COILS

[75] Inventor: George E. S. King, Trinidad, British W. Indies

[73] Assignee: The United States of America as represented by the Secretary of the Navy, Washington, D.C.

[22] Filed: Jan. 2, 1974

[21] Appl. No.: 430,369

[52] U.S. Cl............... 29/596; 29/605; 174/121 AR; 310/43; 310/208
[51] Int. Cl.² ......................................... H02K 15/04
[58] Field of Search ........ 29/596, 605; 310/208, 43; 174/120 AR, 121 AR; 336/209

[56] References Cited
UNITED STATES PATENTS

| | | |
|---|---|---|
| 2,809,230 | 10/1957 | Moses et al........................ 310/208 |
| 2,975,088 | 3/1961 | Rossman et al..................... 310/208 |
| 2,979,432 | 4/1961 | Thiessen ............................ 29/605 X |
| 3,431,639 | 3/1969 | Reimer et al. ......................... 29/605 |
| 3,600,801 | 8/1971 | Larsen et al. ......................... 29/605 |

Primary Examiner—Carl E. Hall
Attorney, Agent, or Firm—Richard S. Sciascia; Arthur A. McGill; Prithvi C. Lall

[57] ABSTRACT

An apparatus and method for producing a replicate, void free, impermeable, symmetrical electrical insulation barrier for stator motor coils is described wherein a silicone rubber compound is employed as an insulator around the preformed stator coils in a copper-beryllium mold. The coil insulation is cured at a predetermined temperature after being subjected to pressure in the mold.

2 Claims, 2 Drawing Figures

3,932,928

METHOD OF INSULATING STATOR COILS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to insulating of electrical coils and more specifically to insulating stator motor coils with a void free, impermeable, and symmetrical electrical insulation barrier.

During the insulating of stator motor coils, it has been long sought to devise a procedure which would produce a uniform electrical insulation barrier for stator motor coils including the lead points of the coils. Conventional practice has largely been the problematic manual application of such insulation. However, severe performance requirements for Naval motors intended for operation under stringent environmental conditions such as high temperature and high hydrostatic pressures have increased the need for better insulation and procedures for applying the insulation to the coils. Investigation of a recently developed, commercially available, molded insulation system revealed that by that system the insulation was applied and molded on the coil wires while they were retained in a flat, elliptical shape. The flat molded coils were later removed from the mold and then mechanically spread and formed into the proper stator coil configuration to facilitate insertion into the intended electrical motor. Although a uniform thickness of insulation was provided around the coil wires, harmful stresses produced on the insulation during the final spreading and shaping process, and poor insulation bonding to the coil wires adversely affected the electrical properties of the coils and left a need for a better method of insulation application to stator coils.

SUMMARY OF THE INVENTION

The objects and advantages of the present invention are accomplished by utilizing an improved method of producing a replicate, void free, impermeable, symmetrical electrical insulation barrier for stator motor coils which comprises the steps of centering each part of a stator coil in the cavity of a mold by using lead spacers, and applying a high pressure for a predetermined time in a hydraulic press to precisely shape the coil to make it conform to and be evenly positioned in the mold cavity. A fiberglass tape is then skip-lapped around the shaped coil. A silicone rubber molding compound milled into sheet form is then completely butt-lapped around the coil including the lead wires. The coil is then positioned in a precleaned mold cavity. The mold is then placed in the hydraulic press under high pressure and any excess silicone rubber flashing is removed from the coil. The mold is then placed on a heated platten of the hydraulic press and subjected to a high pressure for a predetermined time after which the mold is removed and allowed to cool. The molded coils are then removed and are placed in a conventional gravity convection oven at a predetermined temperature for curing.

An object of this invention is to fabricate a void free and symmetrical electrical insulation barrier for stator coils.

Another object of this invention is to make stator coils capable of withstanding high temperatures.

Still another object of this invention is to make stator coils insulation capable of withstanding high hydrostatic pressures under submerged conditions.

Still another object of this invention is to provide a means for making a replicate production of dimensionally and structurally similar insulated stator coils which may be utilized without further processing for the construction and/or repair of electrical machinery stators with a facility analogous to the installation of an automobile tire.

Still another object of this invention is to produce a completely insulated stator coil in its ready-to-install structural form.

Other objects, advantages and novel features of the invention will become apparent from the following detailed description of the invention when considered in conjunction with the accompaning drawings, wherein:

DESCRIPTION OF A PREFERRED EMBODIMENT

Figure 1:
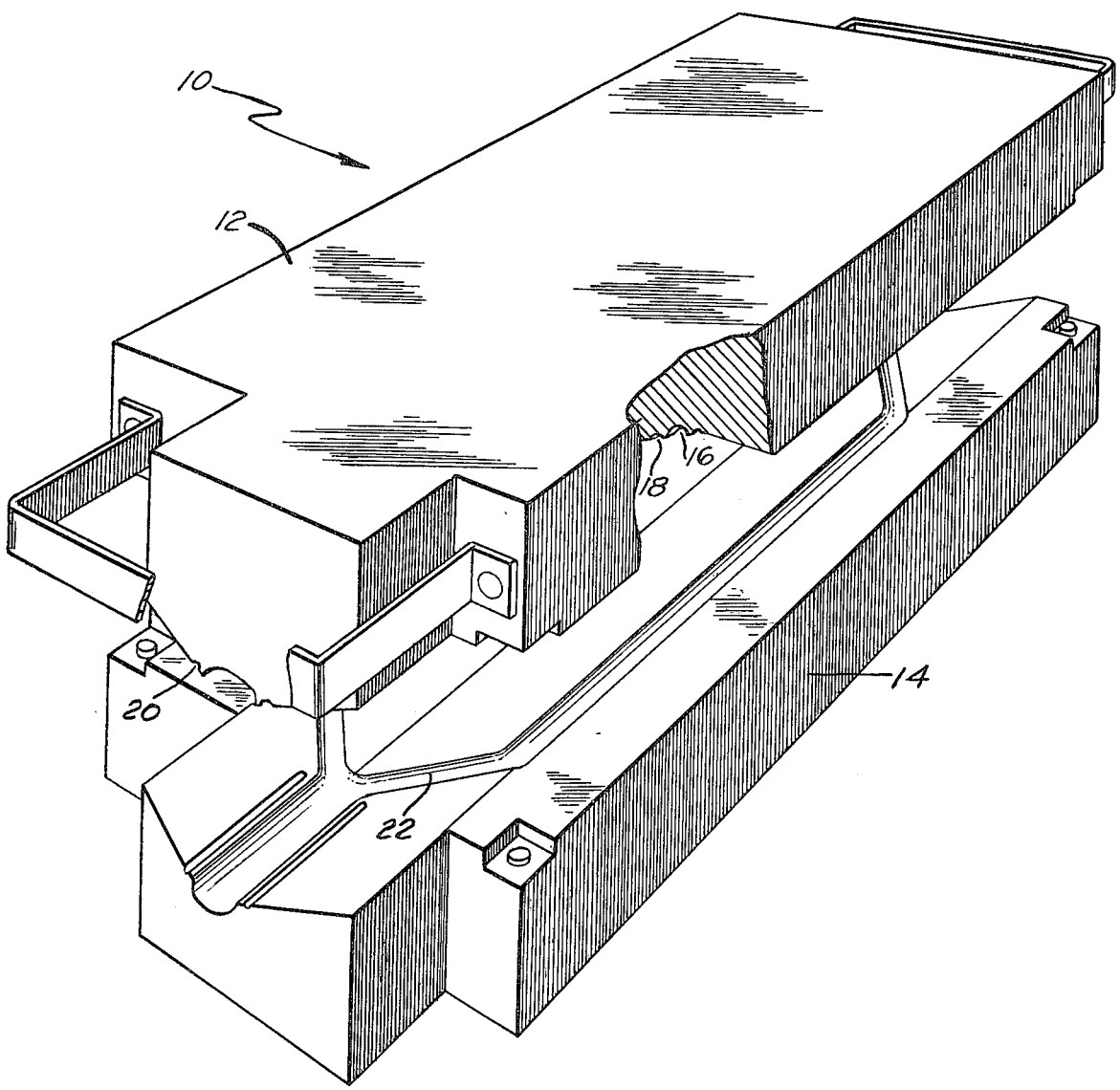
FIG. 1 is an illustration of an improved mold built in accordance with the teachings of the present invention.

A preferred embodiment of an apparatus for making a replicate, void free, impermeable, and symmetrical electrical insulation barrier for stator motor coils is shown in the attached figure wherein numeral 10 represents two mating sections 12 and 14 of a stator coil mold. The mold is preferably a two-piece, copper-berrylium mold which is designed to conform to the shape, dimensions, and contour of the uninsulated form wound coils for a stator motor. Section 12 of the mold has a cavity 16 which is designed to accommodate the uninsulated stator motor coils therein. As shown in the accompanying drawing, the portion of the mold housing the stator coils to be insulated lies in more than one plane. Sufficient clearance is allowed in the cavity 16 to ensure that a uniform insulation wall thickness, preferably 0.06 inch, would be molded around the coil wires. Cavity or flashing groove 18 is also provided in section 12 of the mold to accommodate any extra flashing when the stator coils are put in the mold with the two mating sections joining each other and when the mold is subjected to a high pressure. An extension 20 of the mold provides a means for the insulation of the coil lead wires. Section 14 of the mold has a cavity 22 which is complementary to cavity 16 of section 12.

The insulation molding technique according to the teachings of this invention is as follows:

The coil wires are temporarily secured by ties of thin twine at evenly spaced sections along the coil. In order to effect the centering of each part of the coil in the mold cavity, a number of lead spacers, preferably 1/16 inch thick, are wrapped around the coil wires at equal distances along the length of the coil. The spacers are slightly shorter in length than the perimeter of the coil wires. The spacers applied at the corners of the coil are narrower than the spacers applied at the straight portions of the coil. A few shorter spacers are also wrapped around the two coil lead wires to effect their correct alignment in the mold cavity. The coil, wrapped with lead spacers, is enclosed in the mold which is then subjected to a high pressure, preferably 600 psi, for approximately 15 minutes, in a hydraulic press to precisely shape the coil to make it conform to and be evenly positioned in the mold cavity. The pressure of the press is released and the coil is removed after opening the mold. All the lead spacers except those around the coil lead wires are removed. A reasonably tight skip-lapped wrapping of fiberglass tape, preferably ⅜ inch by 0.005 inch, is applied to the shaped coil and the original temporary twine tyings are removed.

A certain quantity, preferably about 3 pounds, of silicone rubber molding compound; preferably having a dielectric constant of 2.96, a power factor of 0.004, and curing time of 5 minutes at 300°F under a pressure of 150 psi; is milled into a sheet form preferably of 3/32 inch thickness. It is to be noted that one such silicone rubber is General Electric No. SE9044A. However, any other silicone rubber or a like material having similar properties can be used without deviating from the teachings of this invention. The silicone rubber sheet thus formed is preferably cut into ¾ inch and 3/16 inch widths of silicone tape. A single layer of the ¾ inch silicone rubber tape is completely butt-lapped around the coil wires except at the corners and the knuckles of the coil where the silicone rubber tape is slightly overlapped. The 3/16 inch widths of the silicone rubber tape are butt-lapped around the coil lead wires.

Both sections of the mold are thoroughly cleaned to remove any dust or grease and preferably sprayed with a silicone mold release agent such as made by General Electric Company. The previously shaped coil with the silicone rubber tapes thereon is then enclosed in the mold and the mold is placed in the hydraulic press. A high pressure of about 600 psi is then applied to the mold for 15 minutes to compress the insulation around the coil and to squeeze off any excess rubber flashing into the flash groove 18 of the mold. The mold is then removed from the press and is opened and the coil is carefully removed so as not to damage the uncured rubber insulation around it. Any attached rubber flashing is removed from the coil and any uneven or damaged portion of the rubber insulation are corrected by manual application of small pieces of the silicone rubber tape. A strip of the 3/16 inch width silicone rubber tape is placed all along the upper and lower edges of the coil.

Figure 2:
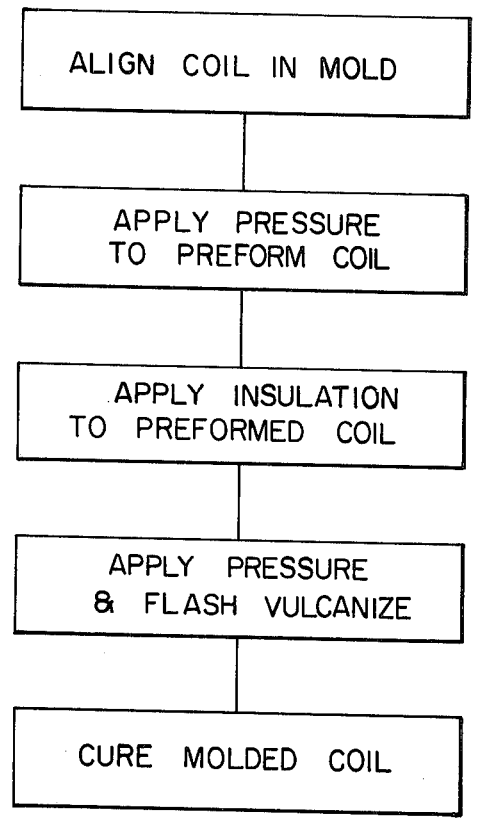
FIG. 2 is a diagramatic representation of the method steps.

Both sections of the mold are then thoroughly cleaned of rubber particles and any other foreign substances. The mold sections are then placed on the platten of the hydraulic press pre-heated to 300°F. When the mold sections attain the temperature of 300°F, they are removed from the hot press and are preferably sprayed with the General Electric silicone release agent. The coil is then enclosed in the mold and the mold is placed on the pre-heated press. The coil is molded for 5 minutes under a pressure of 150 psi at 300°F after which it is removed and allowed to cool. The coils thus molded are placed in a conventional gravity convection oven for about 24 hours at 175°C for curing. FIG. 2 is a diagramatic representation of the above outlined steps.

Briefly stated, the stator coil wires are evenly spaced in the cavity portion of a mold and are subjected to a high pressure in a hydraulic press to put them in a preformed shape. The coil wires are then butt-lapped with a silicone rubber tape and are put back in the cavity of the mold. The mold is then put on a preheated platten of a hydraulic press and cured for a predetermined time at a predetermined temperature under pressure. The molded wires are then placed in a conventional gravity convection oven for curing purposes.

Obviously, many modifications and variations of the present invention are possible in the light of the above teachings. As an example, the shape of the mating sections of the mold may be different as long as the mold is such as to provide a finished, formed, molded insulated stator coil suitable for installation in electrical machinery without further physical alteration. Furthermore, any other suitable silicone rubber compound may be used. It is therefore to be understood that within the scope of the appended claims the invention may be practiced otherwise than as specifically described.

I claim:

1. A method of insulating stator motor coils in a mold, comprising the steps of:
   centering the stator motor coils in a cavity of the mold;
   placing lead spacers along the length of the stator motor coils and the lead wires thereof;
   applying high pressure to the mold for preforming the stator motor coils;
   skip-lapping a fiberglass tape around the preformed stator motor coils;
   butt-lapping a silicone rubber tape over the skip-lapped fiberglass tape around the preformed stator motor coils;
   placing the mold containing the silicone butt-lapped stator motor coils in a preheated platten of a hydraulic press;
   applying pressure to the mold while placed on the preheated platten of the hydraulic press;
   releasing the pressure applied to the mold;
   removing the mold from the preheated platten of the hydraulic press; and curing the molded stator motor coils in a oven.

2. The method of claim 1 wherein said step of centering the stator motor coils in a cavity of the mold includes temporarily securing the stator motor coils by means of ties of twine.

* * * * *